US012692131B2

(12) United States Patent
Erwin

(10) Patent No.: US 12,692,131 B2
(45) Date of Patent: Jul. 28, 2026

(54) CRANE CONSTRUCTION GRIPPING DEVICE AND COMMUNICATION METHOD THEREOF

(71) Applicant: Daniel B. Erwin, Norfolk, VA (US)

(72) Inventor: Daniel B. Erwin, Norfolk, VA (US)

( * ) Notice: Subject to any disclaimer, the term of this patent is extended or adjusted under 35 U.S.C. 154(b) by 961 days.

(21) Appl. No.: 17/898,413

(22) Filed: Aug. 29, 2022

(65) Prior Publication Data

US 2024/0067505 A1 Feb. 29, 2024

(51) Int. Cl.

| | |
|---|---|
| ***B66C 1/00*** | (2006.01) |
| ***B66C 1/40*** | (2006.01) |
| ***B66C 13/46*** | (2006.01) |

(52) U.S. Cl.
CPC ................ *B66C 1/40* (2013.01); *B66C 13/46* (2013.01)

(58) Field of Classification Search
None
See application file for complete search history.

(56) References Cited

U.S. PATENT DOCUMENTS 4,216,868 A * 8/1980 Geppert ............. G01D 5/34792 340/685
11,951,894 B2 * 4/2024 Maki ....................... B66C 23/42
2011/0146114 A1 * 6/2011 Hren ..................... E02F 3/4075 37/445
2011/0191025 A1 * 8/2011 Maynard ............... B66C 15/045 702/152
2011/0204666 A1 * 8/2011 Kjol .......................... B66C 1/62 294/198
2013/0103271 A1 * 4/2013 Best ........................ B66C 13/40 701/50
2021/0354960 A1 * 11/2021 Faloney, Jr. .............. B66C 3/04

* cited by examiner

*Primary Examiner* — Steven M Marsh
(74) *Attorney, Agent, or Firm* — Monarch IP Group, PLLC; April M. Mosby

(57) ABSTRACT

For procedural safety, a gripping device for a crane hook for safely removing a hook from a forklift may include a sensor and a method of communicating the open and closed status of the hook to a crane cab for the driver to be notified. The gripping device can include a handle, having a trigger coupled to a cable seated within a central rod. A pair of jaws may couple to the central rod and a finger may couple to one jaw, wherein the cable is seated within the one jaw and the finger, which can swing about a hinge. As such, when the trigger is actuated while the hook is positioned between the pair of jaws, the cable is pulled, which pulls the finger down to open a latch of the crane hook. When the trigger is released, the cable is released and the finger retracts up.

12 Claims, 7 Drawing Sheets

CRANE CONSTRUCTION GRIPPING DEVICE AND COMMUNICATION METHOD THEREOF

BACKGROUND

The construction industry contributes significantly to many countries' gross domestic products (GDP) and thereby contributes to the economic development of the same. Currently, global expenditure on the construction industry exceeds $11 trillion a year and is expected to rise to around $14.8 trillion by 2030. Specifically, the building construction industry consists of many facets. Whether residential or commercial construction, extensive manpower is needed to complete a construction project. Residential construction may be undertaken by independent property owners, specialized construction builders, property developers, general contractors, or local authorities. Often heavy construction equipment is used, such as construction cranes for the purpose of lifting and maneuvering heavy loads.

Unfortunately, although the construction industry promotes economic development and brings many non-monetary benefits to many countries, it is one of the most hazardous industries. For example, about 20% of US industry fatalities in 2019 happened in construction. There are three serious hazards of the construction industry, in general, and crane operation, in particular, including electrocution, falls from heights, and collapsing loads. Falls are the most common causes of injuries on construction sites because they occur so often. Even if workers take all the necessary precautions to ensure a fall never happens, they still can occur because people can make mistakes or unexpected things can happen. Falls can cause serious injuries from broken bones to paralysis depending on how high the fall is and where it occurs. As to collapsing loads, these can occur whether safety precautions and proper planning have been implemented. Specifically, during the crane's operation, numerous injuries often result from maneuvering loads and/or unhooking a load from the crane hook. In particular, the crane hook must be hooked and unhooked from a forklift that carries a load of building materials. Sometimes injuries can occur including flesh wounds, broken limbs, loss of limbs and loss of life.

It is within this context that the embodiments arise.

SUMMARY

Embodiments of gripping device for a crane hook and method of communicating open and closed status of the hook to a crane user-interface is provided. It should be appreciated that the present embodiment can be implemented in numerous ways, such as a process, an apparatus, a system, a device, or a method. Several inventive embodiments are described below.

In some embodiments, the gripping device for the crane hook is provided. The gripping device for a crane hook for safely removing a hook from a forklift may include a handle, having a trigger coupled to a cable. The gripping device may further include a central rod coupled to the handle, wherein the cable can lie seated within a central rod. A pair of jaws may couple to the central rod, having a finger coupled to one of the pair of jaws. Particularly, the cable can be coupled to the finger, wherein when the cable is pulled by the trigger, the finger pivots downward toward the latch of the crane hook to open the same. As such, when the trigger is actuated, the cable is pulled, which pulls the finger down to open the latch of the crane hook. When the trigger is released, the cable is released and the finger retracts up. The gripping device can also include a pair of magnets coupled to each one of the pair of jaws for attracting each jaw to a side of the crane hook to hold the crane hook stable. Further, the gripping device may include a sensor for detecting the open and closed status of the hook. Moreover, the gripping device may include a transceiver to communicate the open and closed status of the hook to the crane cab user-interface for the driver to be notified.

In some embodiments, a method of a crane hook open and closed state with a crane cab is provided. The method may include detecting contact between a finger of a gripping device and a latch of the crane hook. In particular, the detecting step may include sensing a first juxtapose position of a magnet of a pair of jaws of the gripping device with the crane hook. Further, the detecting may include sensing, in response to the sensed first juxtapose position, a second juxtapose position of the finger of the gripping device with the latch of the crane hook. As a result, the method may include affirming, in response to the sensed second juxtapose position, the contact between a finger of a gripping device and a latch of the crane hook exists. The method may further include indicating, in response to the detected contact, the open state of the crane hook. In the alternative, the method may include indicating, in response to absence of the detected contact, the closed state of the crane hook. Accordingly, the method may include transmitting the open and closed state to a transceiver of the crane cab; and finally, displaying the open and closed state on a display in the crane cab.

In some embodiments, a tangible, non-transitory, computer-readable media having instructions whereupon which, when executed by a processor, cause the processor to perform the crane hook open and closed state communication method described herein. The method may include detecting contact between a finger of a gripping device and a latch of the crane hook by a sensor in a client unit. In particular, the detecting step may include sensing a first juxtapose position of a magnet of a pair of jaws of the gripping device with the crane hook. Further, the detecting may include sensing, in response to the sensed first juxtapose position, a second juxtapose position of the finger of the gripping device with the latch of the crane hook. As a result, the method may include affirming, in response to the sensed second juxtapose position, the contact between a finger of a gripping device and a latch of the crane hook exists using a processor of the client unit. The method may further include indicating, in response to the detected contact, the open state of the crane hook by a transceiver of the client unit. In the alternative, the method may include indicating, in response to absence of the detected contact, the closed state of the crane hook by a transceiver of the client unit. Accordingly, the method may include transmitting the open and closed state to a transceiver of the crane cab using the transceiver of the client unit; and finally, displaying the open and closed state on a display in the crane cab coupled to the transceiver of the crane server unit.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

Figure 1A:
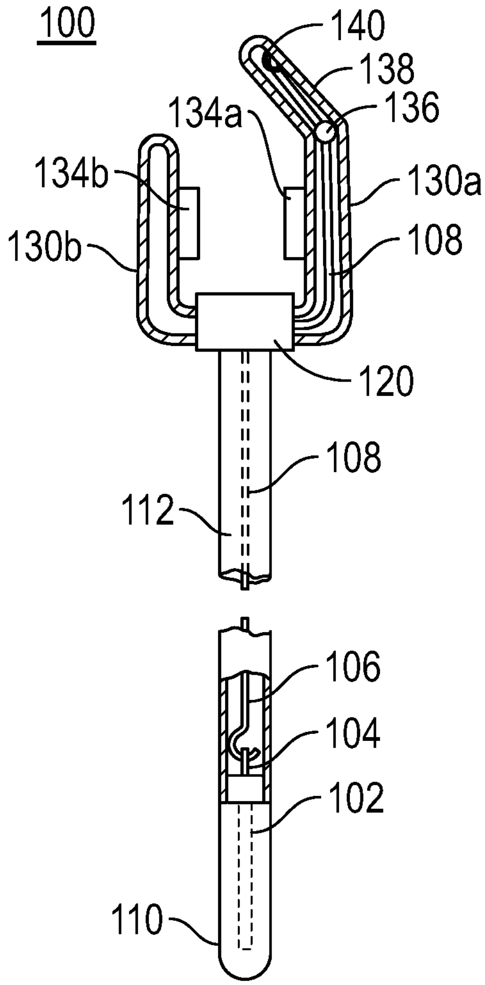
FIG. 1*a* is an elevated view of gripping device for a crane hook, in accordance with some embodiments.

The following embodiments describe a gripping device for a crane hook and method of communicating open and closed status of the hook to a crane user-interface. It can be appreciated by one skilled in the art, that the embodiments may be practiced without some or all of these specific details. In other instances, well known process operations have not been described in detail in order not to unnecessarily obscure the embodiments.

In some embodiments, the gripping device for the crane hook is provided. The gripping device for a crane hook for safely removing a hook from a forklift may include a handle, having a trigger coupled to a cable. The gripping device may further include a central rod coupled to the handle, wherein the cable can lie seated within a central rod. In some embodiments, a portion of the central rod is flexible, such that the central rod can be placed in a predetermined shape for reaching the crane hook from a plurality of angles. A pair of jaws may couple to the central rod, having a finger coupled to one of the pair of jaws. Particularly, the cable can be coupled to the finger, wherein when the cable is pulled by the trigger, the finger pivots downward toward the latch of the crane hook to open the same. As such, when the trigger is actuated, the cable is pulled, which pulls the finger down to open the latch of the crane hook. When the trigger is released, the cable is released and the finger retracts up. The gripping device can also include a pair of magnets coupled to each one of the pair of jaws for attracting each jaw to a side of the crane hook to hold the crane hook stable. Further, the gripping device may include a sensor for detecting the open and closed status of the hook. Moreover, the gripping device may include a transceiver to communicate the detected open and closed status of the hook to the crane cab user-interface for the driver to be notified.

In some embodiments, the central rod may include a first cylindrical portion and a second cylindrical portion, wherein the second cylindrical portion includes an interior flexible rod. A plurality of plates may be coupled to the interior rod to surround and shield the interior rod. Accordingly, the second cylindrical portion can be flexible, such that the central rod can be placed in a predetermined shape for reaching the crane hook from a plurality of angles.

In some embodiments, the gripping device may include a jaw-adjusting bracket coupled between the central rod and the pair of jaws to change the width of the grasping defined by the pair of jaws. In one embodiment, the jaw-adjusting bracket may include a first set of grooves, wherein a fork portion of a first one of the pair of jaws slidably couples to the jaw-adjusting bracket. The jaw-adjusting bracket may further include a second set of grooves, wherein a fork portion of a second one of the pair of jaws slidably couples to the jaw-adjusting bracket. As such, when the plurality of magnets coupled to the pair of jaws are attracted to the crane hook, the pair of jaws slidably move to form a smaller grasping width.

In another embodiment, the jaw-adjusting bracket may include a first fixed jaw of the pair of jaws and a second adjustable jaw, having a joint. The joint may include a worm thread. The jaw-adjusting bracket may further include a worm screw movably coupled to the worm thread. As such, when the worm screw is rotated about the worm thread, a second adjustable jaw moves a relative distance away from the first fixed jaw, to change the grasping width defined by the pair of jaws. In some embodiments, the jaw-adjusting bracket further includes a swivel member coupled to the central rod, wherein the jaw-adjusting bracket can swivel 360 degrees around an axis of the central rod.

In some embodiments, the transceiver may include a receiver coupled to receive the detected contact from the sensor. The transceiver may also include a transmitter coupled to the receiver to transmit the open and closed state of the latch of the crane hook to a second transceiver in the crane user-interface for notice to the driver of the crane.

Advantageously, of the three dangerous aspects of crane operation, the gripping device and innovative communication environment described herein addresses two of the three hazards. In particular, the gripping device disclosed herein protects and prevents workers from falling from heights that are necessary to climb to unlatch a crane hook from a forklift. Further, the communication system integrated within the novel design enables the driver of the cab to be alerted as to the open and closed state of the crane cab, such that construction workers are protected from collapsing loads. In particular, the gripping device for a crane hook and method of communicating open and closed status of the hook to a crane user-interface can save the construction worker the amount of time necessary to climb a flat bed truck which holds the load carried by the crane hook in an effort to connect and disconnect the crane hook and the load. Further, the novel gripping device for a crane hook can save the construction worker from various injuries including, flesh wounds, loss of limbs, broken bones, and/or death. As a result, the innovative design can save building construction companies substantial amounts of time and money that would have been used to cover injuries, damaged equipment, and property.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "detecting," "sensing," "indicating," "transmitting," "displaying," "receiving," "affirming," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1*a*, an elevated view of gripping device 100 for the crane hook (not shown) is provided. The gripping device 100 for a crane hook for safely removing a hook from a forklift may include a handle 110, having a trigger 102 coupled to a cable 108. The gripping device 100 may further include a central rod 112 coupled to the handle 110, wherein the cable 108 can lie seated within a central rod 112. The cable 108 can couple to a clasp 106 that couples to an extension 104 of the handle 110. A jaw-adjusting bracket 120 coupled to the central rod 112 and the pair of jaws (130*a*, 130*b*). The gripping device 100 further may include a finger 138 coupled to one of the pair of jaws 130*a* for shifting the latch of the crane hook open. The pair of jaws (130*a*, 130*b*) may include a set of magnets (134*a*, 134*b*), wherein each magnet may couple to one of the pair of jaws (130*a*, 130*b*). The portion of the central rod 112, the pair of jaws (13*a*, 130*b*), and the finger 138, can be made from a variety of materials selected from the group of cast iron, aluminum, stainless steel, steel, brass, copper, bronze, fiberglass, polymeric materials and the like.

Figure 1B:
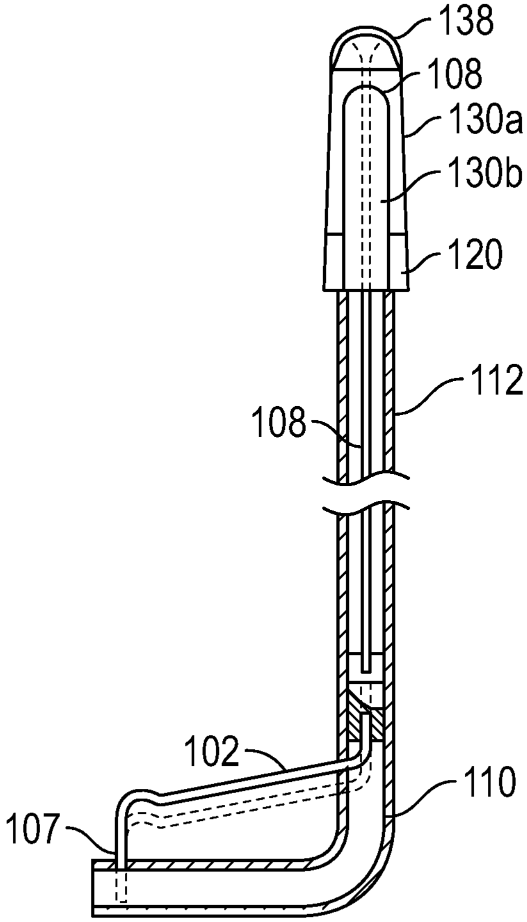
FIG. 1B is a side view of the gripping device for a crane hook of FIG. 1*a* in some embodiments.

Referring now to FIG. 1B, a side view of the gripping device of FIG. 1*a* is shown. Specifically, the handle 110 may include a trigger 102 that couples to the interior of one end of the handle 110. The handle 110 may include a recess 107 that slidably couples to receive the opposite end of the trigger 102. As shown, the cable 108 is seated within the central rod 112. The cable 108 further extends up into one claw 130*a* and travels up to loop 140 of the finger 138 around hinge 136. In some embodiments, the handle may include a mounting bracket (not shown).

Figure 1C:
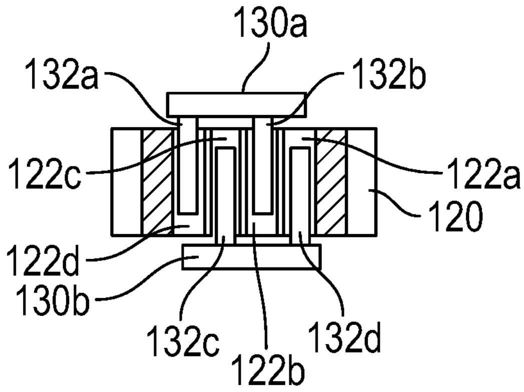
FIG. 1*c* is top view of the jaw-adjusting bracket for slidably coupling the pair of jaws to the central rod, in accordance with some embodiments.

Referring now to FIG. 1*c*, a top view of the jaw adjusting bracket 120 having grooves (122*a*, 122*b*, 122*c*, 122*d*) is provided. Each of the grooves couple to slidably receive each respective one of the fork joints (132*a*, 132*b*, 132*c*, 132*d*) of the pair of jaws 130*a* and 130*b* as shown. Particularly, a first set of grooves 122*b* and 122*d* couple to receive fork joints 132*a* and 132*b*, respectively. Since the fork joints (132*a*, 132*b*) are coupled to the first jaw 130*a*, when the fork joints (132*a*, 132*b*) slide into the grooves (122*b*, 122*d*), the first jaw 130*a* moves inward and outward. Similarly, a second set of grooves 122*a* and 122*c* couple to receive fork joints 132*d* and 132*c*, respectively. Since the fork joints (132*d*, 132*c*) are coupled to the second jaw 130*b*, the second jaw 130*b* moves inward and outward, when the fork joints (132*d*, 132*c*) slide into the grooves (122*a*, 122*c*). As noted supra, the jaw-adjusting bracket 120 can be coupled between the central rod 112 and the pair of jaws (130*a* and 130*b*) to change the width of the grasping defined by the pair of jaws (130*a*, 130*b*). In operation, when the plurality of magnets (134*a*, 134*b*) coupled to the pair of jaws (130*a*, 130*b*) are attracted to the crane hook (not shown), the fork portion (132*a*, 132*b*) of a first one of the pair of jaws (130*a*) slidably moves within the set of grooves (122*b*, 122*d*) within the jaw-adjusting bracket 120. Similarly, the fork portion (132*d*, 132*c*) of a second one of the pair of jaws (130*b*) slidably couples to the jaw-adjusting bracket 120, wherein the pair of jaws (130*a*, 130*b*) slidably move to form a smaller grasping width to grip around the crane hook. In some embodiments, the jaw-adjusting bracket 120 further includes a swivel member (not shown) coupled to the central rod 112, wherein the jaw-adjusting bracket 120 can swivel 360 degrees around an axis of the central rod 112.

Figure 1D:
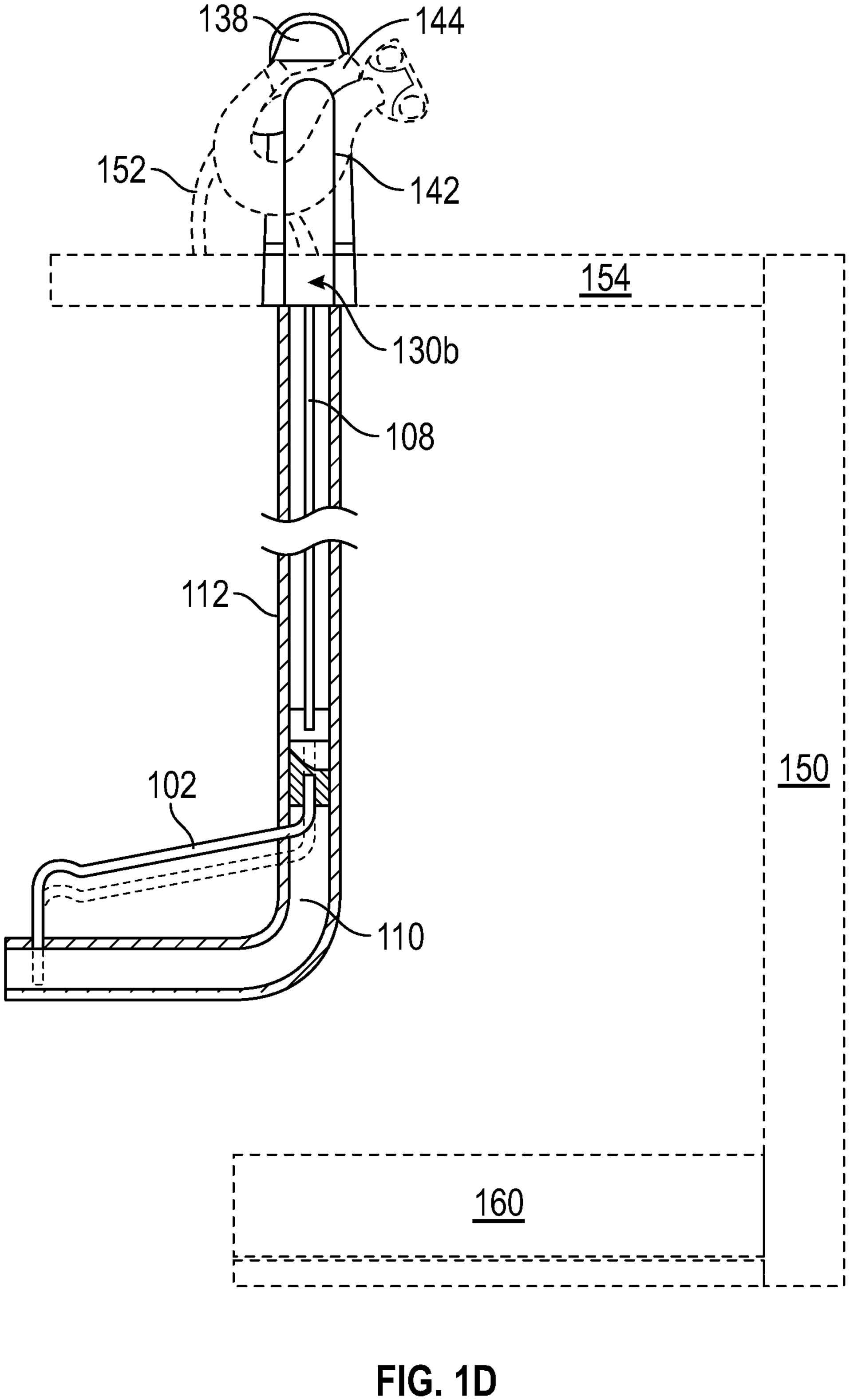
FIG. 1*d* is a perspective view of the gripping device for a crane hook of FIG. 1B with the crane hook in the gripping device in some embodiments.

Referring now to FIG. 1*d*, a prospective view of the gripping device for the crane hook of FIG. 1B with the crane hook 142 held by the gripping device is shown. Particularly, the crane hook 142 may be grabbed with the gripping device 100 using the pair of jaws (130*a*, 130*b*), whereby each respective magnet (134*a*, 134*b*) attracts each side of the crane hook to the jaws (130*a*, 130*b*) to stabilize the crane hook 142 while the finger 138 opens the latch 144.

In operation, the user may grab the handle 110 of the gripping device 100 and extend the gripping device near the crane hook 142 to grasp the hook. In some embodiments, the user can place the central rod 112 in a predetermined shape for reaching the crane hook from a plurality of angles. In other embodiments, the user can swivel the jaw-adjusting bracket 120 to grab the hook from a variety of differing angles. Further, the user can direct the pair of jaws (130*a*,

130*b*) to couple and receive the crane hook 142. Specifically, when the pair of magnets (134*a*, 134*b*) coupled to each respective jaw (130*a*, 130*b*) comes in proximity to the crane hook 142, each respective jaw (130*a*, 130*b*) is attracted to each side of the crane hook, moving the jaws (130*a*, 130*b*) to stabilize the crane hook 142. Once the crane hook 142 is stabilized, the user can pull the trigger 102, which is attached to cable 108 that couples to finger 138. As a result, the cable 108 pulls the finger 138 downward to make contact with the latch 144 of the crane hook 142. Accordingly, the finger 138 opens the latch 144, enabling the user to move the crane hook away from the loop 152 of its connection to the forklift 150 holding the load 160 (as shown in FIG. 1*d*). When the trigger 102 is released, the cable 108 is released and the finger 138 retracts up, enabling the latch 144 to retract back into a closed position. In some embodiments, the gripping device 100 may include a sensor 516 for detecting the open and closed status of the hook (to be explained in more detail with respect to FIG. 5). Moreover, the gripping device 100 may include a transceiver 520 to communicate the detected open and closed status of the hook 140 to the crane cab 230 user-interface for the driver to be notified.

Figure 2:
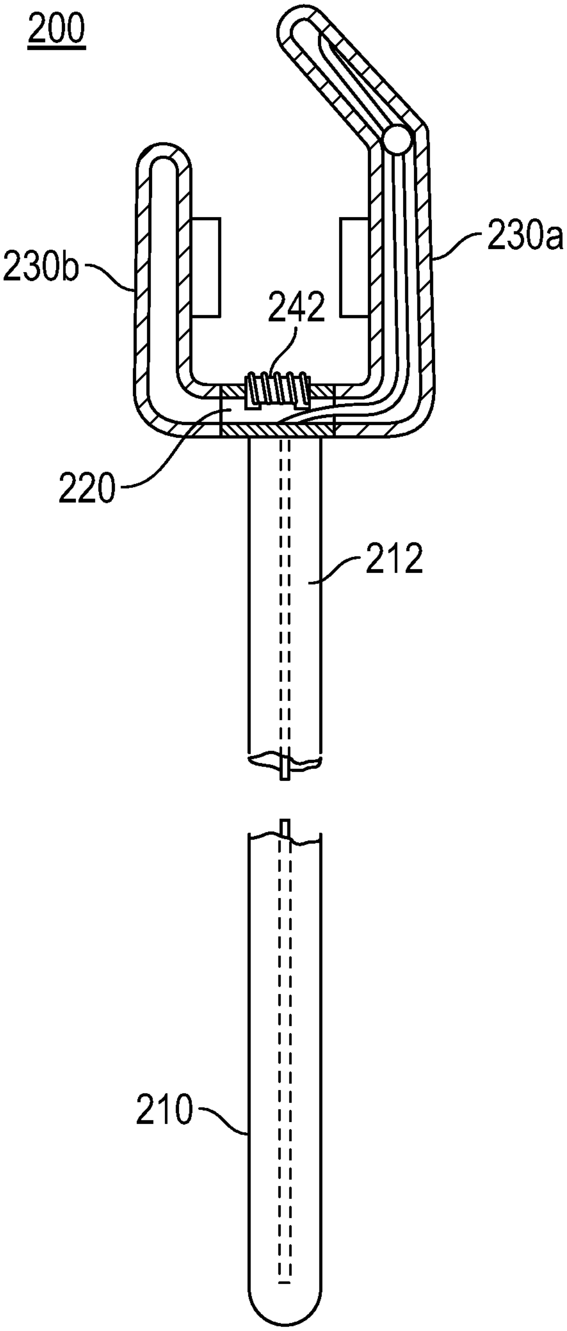
FIG. 2 is an elevated view of a second embodiment of the gripping device for a crane hook having an adjustable bracket, in accordance with some embodiments.

Referring now to FIG. 2, an elevated view of a second embodiment of the gripping device 200 for a crane hook having an adjustable bracket 220 is shown. In particular, the jaw-adjusting bracket 220 may include a first fixed jaw 230*a* of the pair of jaws and a second adjustable jaw 230*b*. The second adjustable jaw 230*b* may include a joint (not shown), having a worm thread. The jaw-adjusting bracket 220 may further include a worm screw 242 movably coupled to the worm thread. In operation, the user can rotate the worm screw 242 about the worm thread of the joint (not shown) such that the second adjustable jaw 230*b* moves a relative distance away from and/or towards the first fixed jaw 230*a*, to change the grasping width defined by the pair of jaws (230*a*, 230*b*).

Figure 3:
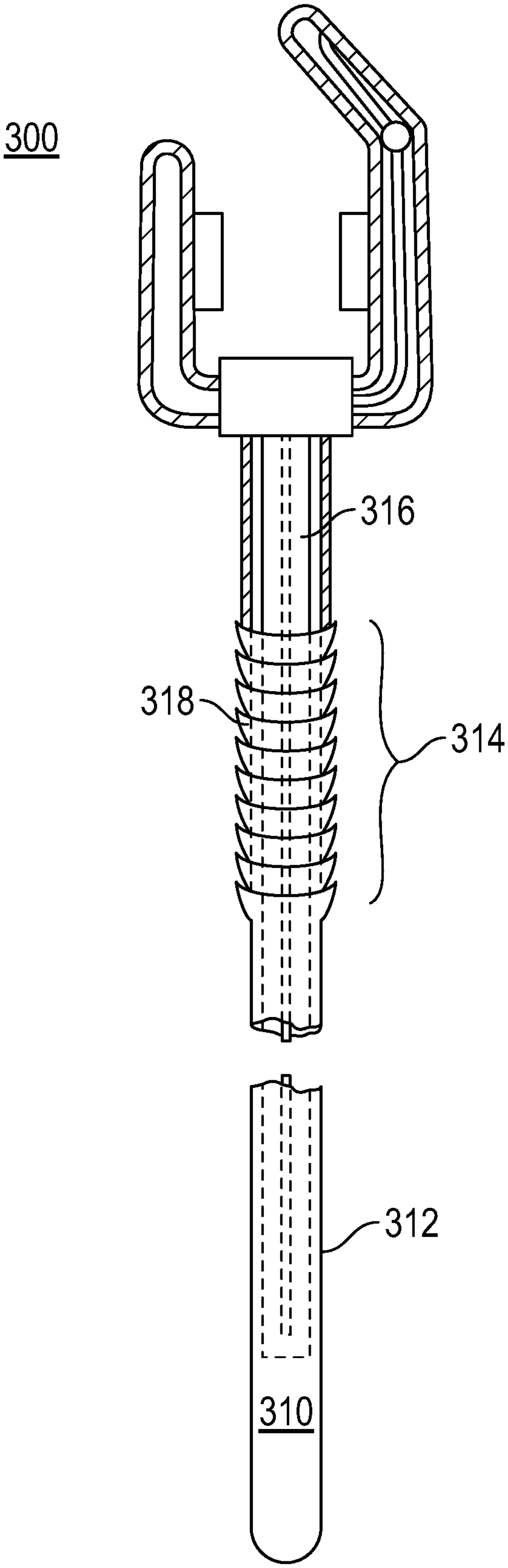
FIG. 3 is an elevated view of a third embodiment of the gripping device for a crane hook having a flexible central rod, in accordance with some embodiments.

Referring now to FIG. 3, an elevated view of a third embodiment of the gripping device for a crane hook having a flexible central rod 310 is shown. The central rod 310 may include a first cylindrical portion 312. Further, the central rod may include a second cylindrical portion 314, having an interior flexible rod 316, whereby a plurality of cylindrical plates 318 may couple to the interior flexible rod 316 to surround and shield the interior flexible rod 316. Accordingly, the second cylindrical portion 314 can be flexible, such that the central rod 310 can be placed in a predetermined shape for reaching the crane hook from a plurality of angles. In operation, the user can place the central rod 310 in a predetermined shape for reaching the crane hook 142 to connect and disconnect the hook 142 from a forklift having a load (to be described further with reference to FIG. 4).

Figure 4:
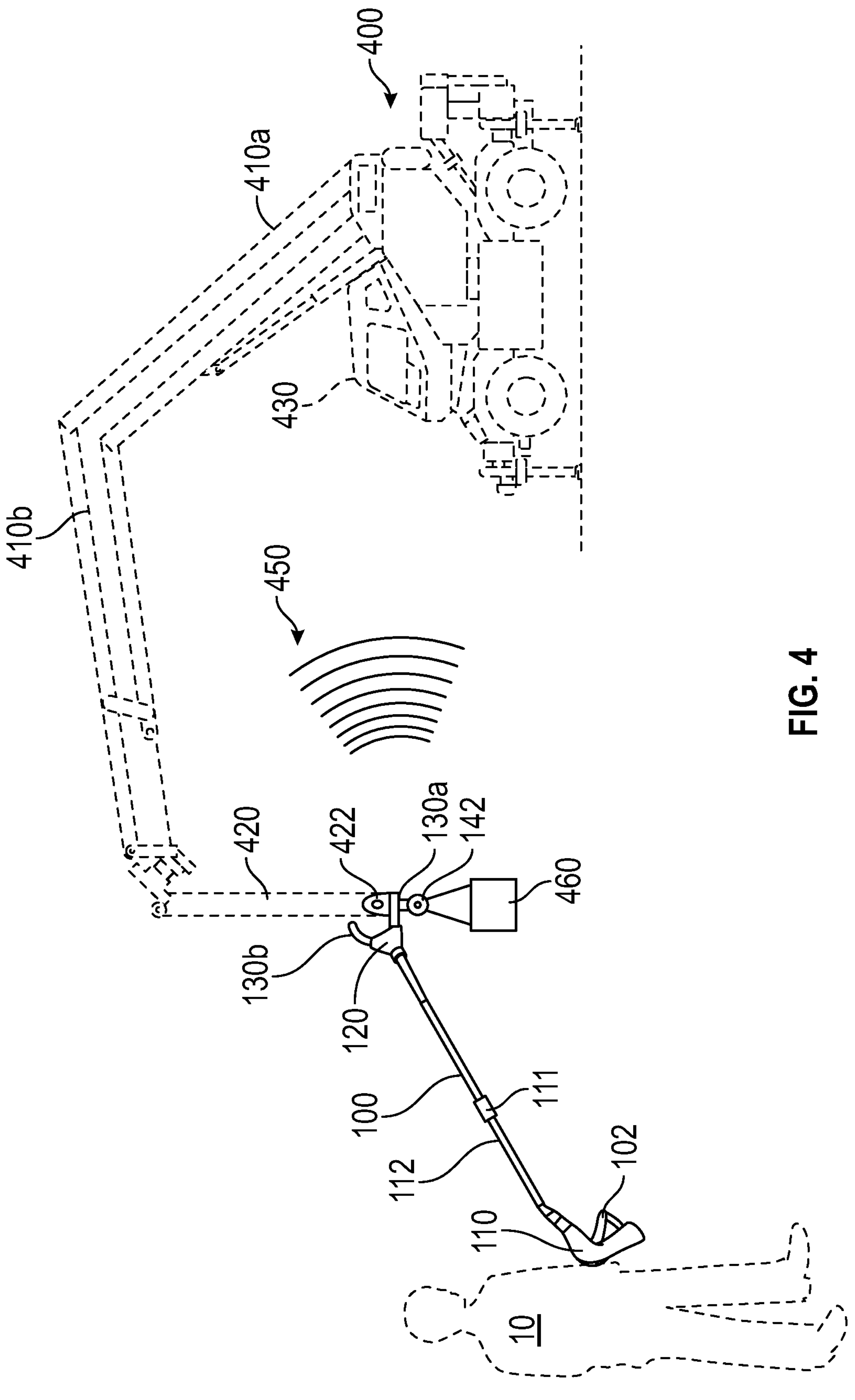
FIG. 4 is perspective view of the gripping device in communication with the server of the crane cab, in some embodiments.

Referring now to FIG. 4, a perspective view of the gripping device in communication with the server of the crane cab is provided. Particularly, the user 10 may hold the gripping device 100 at the handle 110, wherein the gripping device 100 can include a jaw-adjusting bracket 120. The jaws (130*a*, 130*b*) couple to the bracket 120. The user may position the jaws (130*a*, 130*b*) close to grip around the crane hook 142, in an effort to open and close the latch of the hook 140. The crane 400 may include a crane cab 430 for the driver to be seated, where a user interface (not shown) can display the open and close state of the crane hook 142. The crane includes an arm (410*a*, 410*b*), having an extension 420 that couples to a jib 422. The jib 422 couples to the crane hook 142.

In operation, the user 10 can position the gripping device 100 close to the crane hook 142 and squeeze the trigger 102 to pull the finger 138 downward, opening the latch 144 on the hook 140. A sensing device 516 within the gripping device 100 can detect the open and close state of the crane hook 142 (details explained further with respect to FIG. 5). A transceiver 520 within the sensing device 510 can send a signal via short transmission signal (570), such as Wi-Fi or Bluetooth to the user interface display panel (556) within cab 430. The transceiver 520 can be enabled to communicate by one or more of the plurality of communication utilities, including but not limited to Bluetooth, Wi-Fi, NFC, RFID, GSM and like. This will enable the driver within cab 430 to see the open and close state of the crane hook 142 for the indication of how the driver can shift to the next step in processing the load safely.

Figure 5:
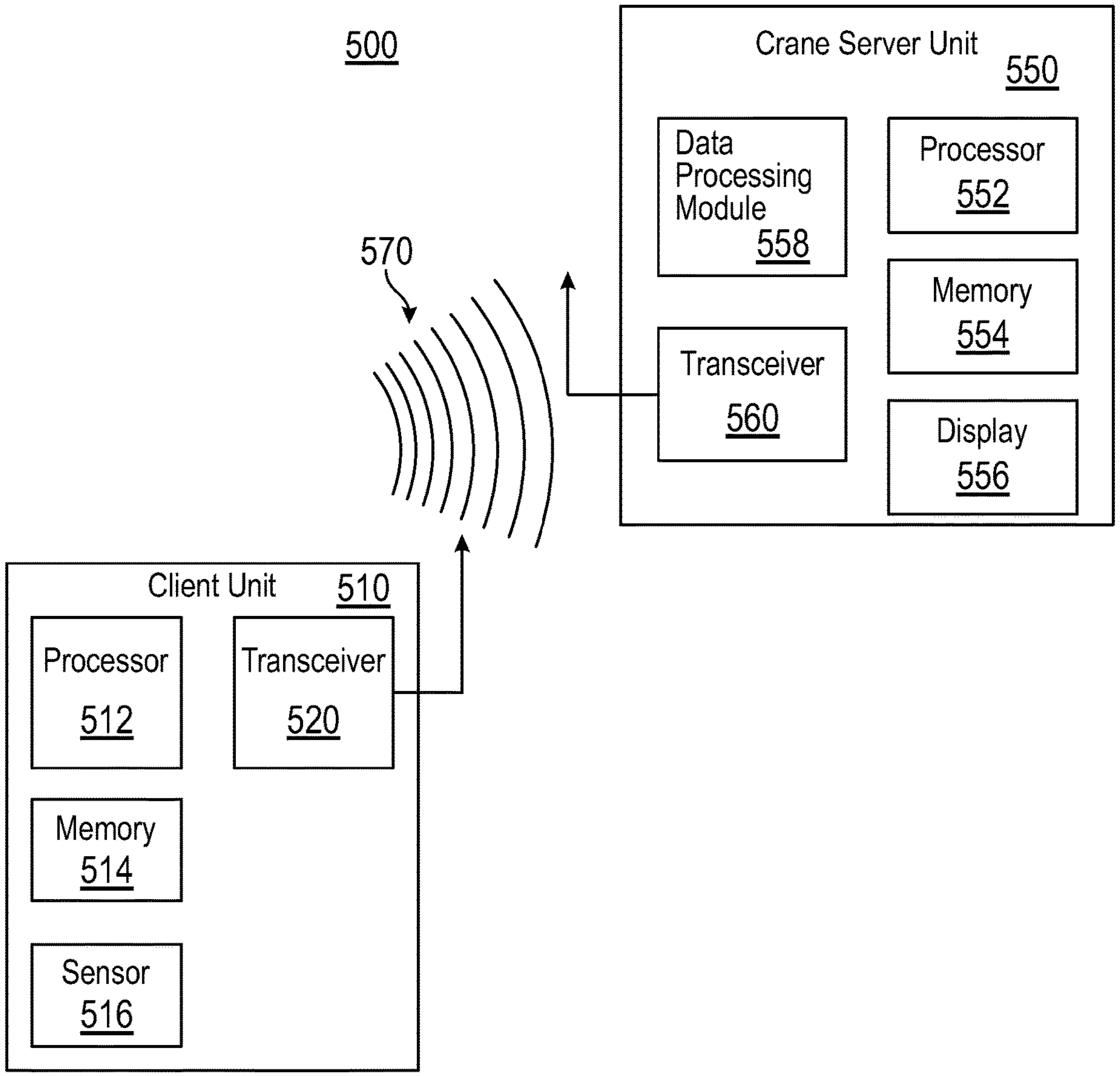
FIG. 5 is a block diagram showing an operating environment and a communication path for the gripping device in communication with the server of the crane cab, in accordance with some embodiments.

Referring now to FIG. 5, a block diagram showing a operating environment 500 and communication path for the gripping device in communication with the server of the crane cab in accordance with some embodiments is provided. The operating environment 500 may include a client unit 510 coupled to a crane server 550. The client unit 510 may include a processor 512, a memory 514, a sensor 516, and a transceiver 520. The client unit 510 may be included within the gripping device 100 within the jaw-adjusting bracket 120, the handle 110, the central rod 112, either jaw (130*a*, 130*b*), and/or the finger 138. The crane server 550 may include a data processing module 558, a transceiver 560, a processor 552, a memory 554, and a display 556. In operation, the sensor 516 may detect, in cooperation with the processor 512 and memory 514, the open and close state of crane hook 142. In particular, the sensor 516 may be coupled to the jaw 130*a* and the finger 138, such that it can detect whether the trigger 102 has been actuated to pull the latch 144 downward to an open position. In the alternative, the sensor 516 may be able to detect whether the trigger 102 has not been actuated, thereby leaving the latch 144 in a closed position. The sensor 516 can communicate the open and closed state of the latch 144 (crane hook 142) to the transceiver 520. The transceiver 520 may be comprised of a transmitter and a receiver (not shown). In response, the transceiver 520 can transmit (using its transmitter) the open and close state of the crane hook 142 through the short-wave transmission signal 570 to the crane server 550. Consequently, the transceiver 560 of the crane cab server 550 can couple to receive the signal from the client unit 510. The data processing module 558, working in cooperation with the processor 552 and memory 554, can generate signals for notification of the open and closed position of the crane hook to be displayed upon display 556. Accordingly, the open and closed position of the crane hook 142 can be displayed upon display 556 for the driver to safely transition to the next step in the building construction process.

In some embodiments, the sensor 516 may couple to the finger 138 to detect contact between a finger of a gripping device and a latch of the crane hook. In particular, the sensor 516 may sense a first juxtapose position of magnets (134*a*, 134*b*) of a pair of jaws (130*a*, 130*b*) of the gripping device 100 with the crane hook 142. Further, in response to the sensing the first juxtapose position, the sensor 516 may sense a second juxtapose position of the finger 138 of the gripping device 100 with the latch 144 of the crane hook 142. Accordingly, the sensor 516 may affirm, in response to the sensed second juxtapose position, the contact between a finger 138 of a gripping device 100 and a latch 144 of the crane hook 142 exists. Consequently, the sensor 516 may also affirm the open state of the crane hook 142. In the alternative, the sensor 516 may also affirm the closed state of the crane hook 142 when either of the first and second juxtapose positions are absent. Accordingly, sensor 516 may transmit the open and closed state to the transceiver 520 of the client unit 510.

It is appreciated that the components of exemplary operating environment 500 are exemplary and more or fewer components may be present in various configurations. It is appreciated that operating environment may be part of a distributed computing environment, a cloud computing environment, a client server environment, and the like.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 6:
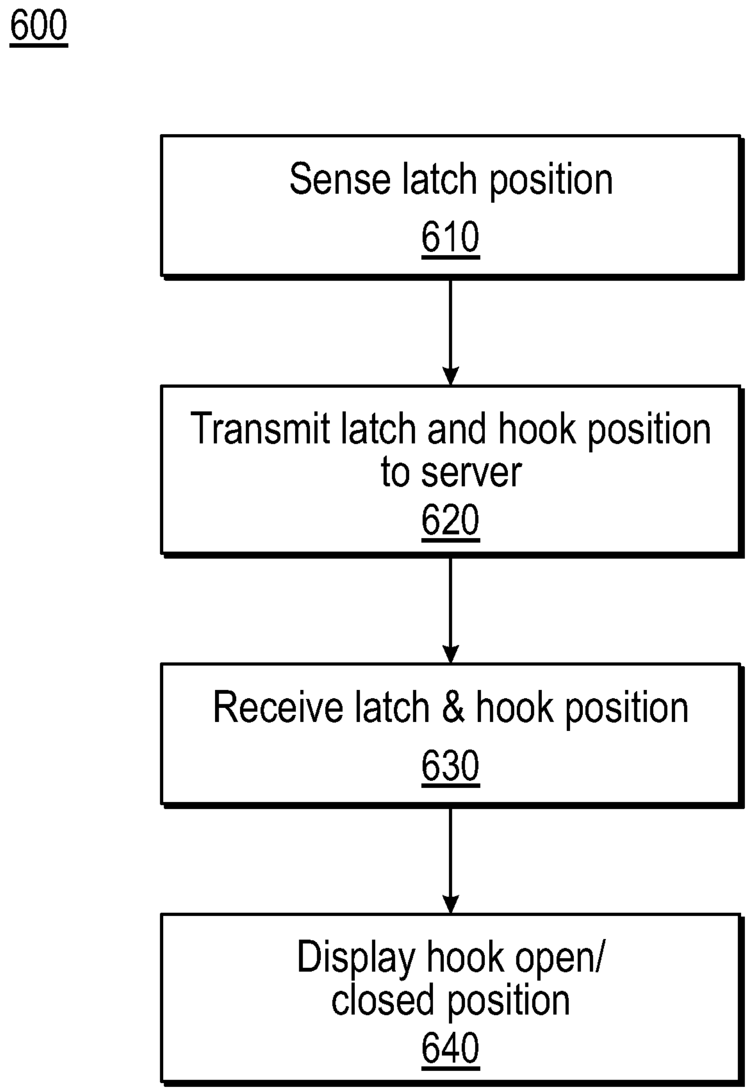
FIG. 6 is a flow diagram of a method for communicating the open and closed state of the crane hook, in accordance with some embodiments.

Referring now to FIG. 6, a flow diagram of a method for communicating the open and closed state of the crane hook in accordance with some embodiments is shown. In an action 610, the gripping device may sense the latch position. For example, the sensor 516 may sense a first juxtapose position of magnets (134*a*, 134*b*) of a pair of jaws (130*a*, 130*b*) of the gripping device 100 with the crane hook 142. Further, in response to the sensing the first juxtapose position, the sensor 516 may sense a second juxtapose position of the finger 138 of the gripping device 100 with the latch 144 of the crane hook 142. Accordingly, the sensor 516 may affirm, in response to the sensed second juxtapose position, the contact between a finger 138 of a gripping device 100 and a latch 144 of the crane hook 142 exists. Consequently, the sensor 516 may also affirm the open state of the crane hook 142. In the alternative, the sensor 516 may also affirm the closed state of the crane hook 142 when the first and second juxtapose positions are absent.

In an action 620, the method for communicating the open and closed state of the crane hook in some embodiments may include the gripping device enabled to transmit the position of the latch or the open and closed position of the crane hook to the crane server unit 550. For, example, the sensor 516 can communicate the open and closed state of the latch 144 (crane hook 142) to the transceiver 520. The transceiver 520 may be comprised of a transmitter and a receiver (not shown). In response, the transceiver 520 can transmit (using its transmitter) the open and close state of the crane hook 142 through the short-wave transmission signal 570 to the crane cab server 550.

Further, in an action 630, the crane cab transceiver may couple to receive the open and close state of the crane hook. For example, the transceiver 560 of the crane cab server 550 can couple to receive the signal from the client unit 510. Moreover in an action 640, the data processing module within the crane server 550 can generate a display signal for the driver to be notified of the open and closed position of the crane hook. For example, the crane cab server data processing module 558 upon receipt of the open and closed position state from the transceiver 560 can generate a signal to be sent to the display 556, wherein the open and close state of the crane hook 142 can be displayed on the user interface within the cabin of the crane for the driver to make safety-minded decisions in constructing the building.

Figure 7:
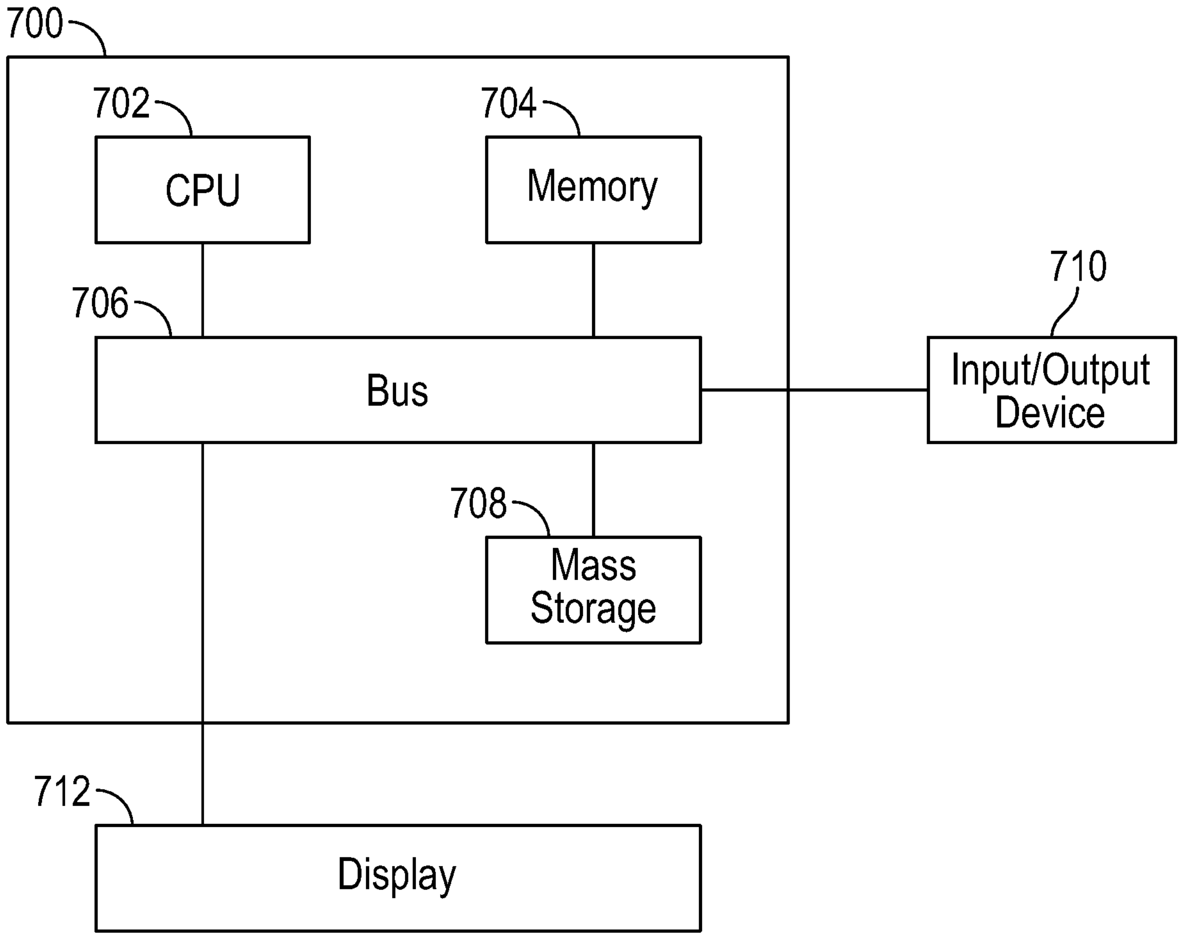
FIG. 7 is an illustration showing an exemplary computing device, which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 7 is an illustration showing an exemplary computing device, which may implement the embodiments described herein. The computing device of FIG. 7 may be used to perform embodiments of the functionality for performing the data recovery of large datasets in accordance with some embodiments. The computing device includes a central processing unit (CPU) 702, which is coupled through a bus 706 to a memory 704, and mass storage device 708. Mass storage device 708 represents a persistent data storage device such as a floppy disc drive or a fixed disc drive, which may be local or remote in some embodiments. The mass storage device 708 could implement a backup storage, in some embodiments. Memory 704 may include read only memory, random access memory, etc. Applications resident on the computing device may be stored on or accessed through a computer readable medium such as memory 704 or mass storage device 708 in some embodiments. Applications may also be in the form of modulated electronic signals modulated accessed through a network modem or other network interface of the computing device. It should be appreciated that CPU 702 may be embodied in a general-purpose processor, a special purpose processor, or a specially programmed logic device in some embodiments.

Display 712 is in communication with CPU 702, memory 704, and mass storage device 708, through bus 706. Display 712 is configured to display any visualization tools or reports associated with the system described herein. Input/output device 710 is coupled to bus 706 in order to communicate information in command selections to CPU 702. It should be appreciated that data to and from external devices may be communicated through the input/output device 710. CPU 702 can be defined to execute the functionality described herein to enable the functionality described with reference to FIGS. 4-6. The code embodying this functionality may be stored within memory 704 or mass storage device 708 for execution by a processor such as CPU 702 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein. In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A gripping device for a crane hook, comprising:
a handle, having a trigger coupled to a cable;
a central rod coupled to the handle, wherein the cable is seated inside the central rod; and
a grip, having a pair of jaws, coupled to the central rod; wherein each jaw includes a magnet coupled thereto;
a finger coupled to one of the pair of jaws, wherein the cable couples to an interior of the finger to control the movement of the finger;
wherein when a crane hook is placed near the pair of jaws, the pair of magnets exert magnetic force upon the crane hook to connect the pair of jaws within the gap formed by the pair of jaws to stabilize the crane hook;
wherein when the trigger is actuated, the trigger pulls the cable and the cable pulls the finger down to open a latch of the crane hook and when the trigger is released, the trigger releases the cable and the finger retracts up.

2. The gripping device of claim 1, further comprising:
a jaw-adjusting bracket coupled between the central rod and the pair of jaws to change a width of the grasping defined by the pair of jaws.

3. The gripping device of claim 2, wherein the jaw-adjusting bracket comprises,
a first fixed jaw of the pair of jaws;
a second adjustable jaw, having a joint, wherein the joint includes a worm thread;
a worm screw movably coupled to the worm thread, wherein when the worm screw is rotated about the worm thread, the second adjustable jaw moves a relative distance away from the first fixed jaw, to change the grasping width defined by the pair of jaws.

4. The gripping device of claim 2, wherein the jaw-adjusting bracket comprises,
a first set of grooves, wherein a fork portion of a first one of the pair of jaws slidably couples to the jaw-adjusting bracket;
a second set of grooves, wherein a fork portion of a second one of the pair of jaws slidably couples to the jaw-adjusting bracket, wherein when the plurality of magnets coupled to the pair of jaws are attracted to the crane hook, the pair of jaws slidably move to form a smaller grasping width.

5. The gripping device of claim 1, further comprising:
a sensor coupled to the finger to detect contact between the finger and the latch of the crane hook and designate an open and closed state of the latch.

6. The gripping device of claim 5, further comprising:
a first transceiver coupled to receive the detected contact from the sensor; and
wherein, a second transceiver of a crane cab is coupled to the first transceiver to receive the open and closed state of the latch of the crane hook for driver notice of the open and closed state.

7. The gripping device of claim 6, wherein the first transceiver comprises,
a receiver coupled to the sensor to receive the detected contact; and
a transmitter coupled to the receiver to transmit the open and closed state of the latch of the crane hook to the second transceiver.

8. The gripping device of claim 7, wherein the transmitter and the transceiver are enabled to communicate by one or more of a plurality of communication utilities: Bluetooth, Wi-Fi, NFC, RFID, and GSM.

9. The gripping device of claim 1, wherein a portion of the central rod, the grip, the pair of jaws, and the finger, are selected from a group of cast iron, aluminum, stainless steel, steel, brass, copper, bronze, fiberglass, and polymeric materials.

10. The gripping device of claim 1, wherein the pair of magnets is selected from a group consisting of ferromagnetic materials, including iron, steel, nickel, and cobalt.

11. The gripping device of claim 1, wherein the central rod comprises,
a first cylindrical portion;
a second cylindrical portion, having an interior flexible rod and a plurality of plates coupled to the interior rod to surround the interior flexible rod, such that the second cylindrical portion is flexible, wherein the central rod can be placed in a predetermined shape for reaching the crane hook from a plurality of angles.

12. The gripping device of claim 2, wherein the jaw-adjusting bracket further comprises,
a swivel member coupled to the central rod, wherein the jaw-adjusting bracket can swivel 360 degrees around an axis of the central rod.

* * * * *